(12) United States Patent  (10) Patent No.: US 8,880,564 B2
Jayadevan et al. (45) Date of Patent: Nov. 4, 2014

(54) GENERIC MODEL EDITING FRAMEWORK

(75) Inventors: Siddharth Jayadevan, Seattle, WA (US); Antony Scott Williams, Mercer Island, WA (US); James R. Flynn, Seattle, WA (US); Florian Voss, Seattle, WA (US); Anthony Christopher Bloesch, Vashon, WA (US)

(73) Assignee: Microsoft Corporation, Redmond, WA (US)

( * ) Notice: Subject to any disclaimer, the term of this patent is extended or adjusted under 35 U.S.C. 154(b) by 825 days.

(21) Appl. No.: 11/871,001

(22) Filed: Oct. 11, 2007

(65) Prior Publication Data

US 2009/0100084 A1 Apr. 16, 2009

(51) Int. Cl.
  *G06F 17/30* (2006.01)

(52) U.S. Cl.
  CPC .................. *G06F 17/30716* (2013.01)
  USPC .......................................... 707/803

(58) Field of Classification Search
  USPC .......................................... 707/803
  See application file for complete search history.

(56) References Cited

U.S. PATENT DOCUMENTS

| 5,446,575 | A | 8/1995 | Lysakowski, Jr. |
| 6,609,122 | B1 | 8/2003 | Ensor |
| 6,643,663 | B1 | 11/2003 | Dabney et al. |
| 7,055,095 | B1 | 5/2006 | Anwar |
| 7,089,256 | B2 | 8/2006 | Smialek |
| 2002/0013779 | A1 | 1/2002 | Sridhar |
| 2002/0069083 | A1 | 6/2002 | Harter et al. |
| 2003/0028562 | A1* | 2/2003 | Shaughnessy et al. ....... 707/513 |
| 2004/0006744 | A1* | 1/2004 | Jones et al. .................... 715/514 |
| 2004/0060002 | A1 | 3/2004 | Lucovsky et al. |
| 2004/0172617 | A1* | 9/2004 | Ramani et al. ................ 717/114 |
| 2004/0268229 | A1* | 12/2004 | Paoli et al. .................... 715/508 |
| 2005/0027559 | A1* | 2/2005 | Rajan et al. ...................... 705/1 |
| 2005/0027752 | A1 | 2/2005 | Gelbard |

(Continued)

FOREIGN PATENT DOCUMENTS

| JP | 2000231480 A | 8/2000 |
| JP | 2001273313 A | 10/2001 |
| JP | 2006127277 A | 5/2006 |
| JP | 2006244488 A | 9/2006 |
| WO | 2006/137563 A1 | 12/2006 |

OTHER PUBLICATIONS

Article entitled "Generic Views on Data Types" by Holdermans et al., copyright 2005.*

(Continued)

*Primary Examiner* — Mahesh Dwivedi
(74) *Attorney, Agent, or Firm* — Nicholas Chen; Brian Haslam; Micky Minhas (57) ABSTRACT

In one embodiment, a computer system generates a view of entities associated with varying data types for presentation on a generic viewer. The entities and data types have relationships as defined in a corresponding schema. The schema is stored as data in a repository with the data types. The computer system receives an edit request configured to change various selected entities, where each entity has an associated data type, queries the repository to determine various properties of the selected entities corresponding to the received edit request including the data type, and determines, based on the schema, that the edit is valid based on relationship information stored in the schema. The computer system also sends the validated edit information to the generic viewer for presentation. The generic viewer has no prior knowledge of how to handle the selected entities and corresponding data types.

12 Claims, 6 Drawing Sheets

(56) References Cited

U.S. PATENT DOCUMENTS

| | | | |
|---|---|---|---|
| 2005/0091300 A1* | 4/2005 | Starbuck et al. | 709/200 |
| 2005/0256852 A1 | 11/2005 | McNall et al. | |
| 2006/0129590 A1 | 6/2006 | Brown et al. | |
| 2006/0206503 A1* | 9/2006 | Gaurav et al. | 707/100 |
| 2006/0215448 A1* | 9/2006 | Ellis et al. | 365/185.01 |
| 2006/0241956 A1* | 10/2006 | Levy et al. | 705/1 |
| 2006/0242104 A1 | 10/2006 | Ellis et al. | |
| 2006/0259458 A1* | 11/2006 | Hunter et al. | 707/2 |
| 2007/0073712 A1* | 3/2007 | Falk et al. | 707/10 |
| 2007/0124320 A1 | 5/2007 | Stuhec | |
| 2008/0092057 A1* | 4/2008 | Monson et al. | 715/744 |
| 2008/0222515 A1* | 9/2008 | Burns | 715/236 |
| 2009/0006947 A1* | 1/2009 | Corning et al. | 715/255 |
| 2009/0019005 A1* | 1/2009 | Hu et al. | 707/3 |
| 2009/0089739 A1* | 4/2009 | Mollicone et al. | 717/105 |

OTHER PUBLICATIONS

Welcome to GMOD; http://www.gmod.org/; (2 pages), Oct. 5, 2007.

Xcase Database Design Software. A visual data modeling tool; Xcase: Your Invaluable Database Assistant; http://www.xcase.com/?referrer=google&gclid=COalyaXK914CFRYcEAodyGyqlw; (1 page), Oct. 5, 2007.

Visio Database Modeling Solution: Integeration with Other Modeling Tools; Integrating the Visio Database Modeling Solution with Other Modeling Tools; http://www.microsoft.com/technet/prodtechnol/Visio/visio2002/maintain/dbmodel.mspx; (10 pages), Sep. 1, 2001.

"Office Action Received in Japan Patent Application No. 2010-528980", Mailed Date: Oct. 25, 2013, Filed Date: Oct. 7, 2008, 6 pages.

* cited by examiner

GENERIC MODEL EDITING FRAMEWORK

BACKGROUND

Computers have become highly integrated in the workforce, in the home, and in mobile devices. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications can be used to generate, edit and display data in the form of models. For example, models may be used by businesses and other entities to describe processes, systems, entities and other information. Some models may be referred to as flow diagrams, process flows, flowcharts, process diagrams and/or control charts. Others may be referred to as lists, tables, pie charts, or other forms of categorizing and displaying data. In some cases, models may be used to illustrate organizational relationships between the elements of a system. These models are often referred to as organizational charts. In a broader sense, models may be used to show any type of relationship information between different objects.

Many times, however, software programs configured to generate, display and edit data are limited by the type of data. For example, software programs are often hard-coded to be able to generate, edit or navigate certain types of data but not others. Furthermore, data categorization and display may be limited to certain layouts or display forms based on the type of data. Thus, computer-run software applications used to generate, view, edit or navigate models, data sets or other information, may rely on data type to determine which functionality will be available to the end user.

BRIEF SUMMARY

Embodiments described herein are directed to frameworks for editing and presenting data. In one embodiment, a computer system performs a method for editing one or more entities, the types of which are potentially unknown prior to performing the edit. For example, a computer system generates a view of entities associated with entities of varying data types for presentation on a generic viewer. The entities and data types have relationships as defined in a corresponding schema. The schema is stored as data in a repository with the data types. The computer system receives an edit request configured to change various selected entities, where each entity has an associated data type. The computer system queries the repository to determine various properties of the selected entities corresponding to the received edit request including the data type. The computer system determines, based on the schema, that the edit is valid based on relationship information stored in the schema. The computer system also sends the validated edit information to the generic viewer for presentation. The generic viewer has no prior knowledge of how to handle the selected entities and corresponding data types.

In another embodiment, a computer system performs a method for navigating between entities of varying data types. For example, a computer system generates a view of entities associated with entities of varying data types for presentation on a generic viewer. The entities and data types have relationships as as defined in a corresponding schema. The schema is stored as data in a repository with the data types. The computer system receives a navigation input indicating selection of a second selected entity associated with a second, different data type. The computer system accesses relationship information for the data types associated with the first and second selected entities. The computer system generating an updated view including the first selected entity and the second selected entity, the updated view being based on the accessed relationship information. The computer system also presents the generated updated view based on the navigation input.

In another embodiment, a computer system performs a method for providing hints in a schema indicating how an entity is to be displayed. For example, a computer system generates a view of entities associated with entities of varying data types for presentation on a generic viewer. The entities and data types have relationships as defined in a corresponding schema. The schema is stored as data in a repository with the data types. The computer system receives a user input indicating an action to be taken on at least one entity. The computer system accesses hints stored in the repository to determine which action to perform on the entity based on the user input. The hints describe which actions to take when a user provides certain pre-defined inputs. The computer system also performs the determined action according to the hints corresponding to the user input.

In another embodiment, a computer system performs a method for displaying a combination of two or more composed views based on various entities. For example, a computer system generates a first view of various entities associated with entities of various data types for presentation on a generic viewer. The entities and data types have various relationships defined in a corresponding schema. The schema is stored as data in a repository with the data types. The computer system as generates a second view of various entities associated with entities of various data types for presentation on a generic viewer. The computer system receives a user input indicating that the first and the second views are to be integrated. The computer system integrates the first and the second views according to the user input. The computer system also updates the entities associated with the entities of the first view and the second view according to each entity's corresponding schema.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments described herein are directed to frameworks for editing and presenting data. In one embodiment, a computer system performs a method for editing one or more entities, the types of which are unknown prior to performing the edit. For example, a computer system generates a view of entities associated with entities of varying data types for presentation on a generic viewer. The entities and data types have relationships as defined in a corresponding schema. The schema is stored as data in a repository with the data types. The computer system receives an edit request configured to change one or more selected entities, where each entity has an associated data type. The computer system queries the repository to determine various properties of the selected entities corresponding to the received edit request including the data type. The computer system determines, based on the schema, that the edit is valid based on relationship information stored in the schema. The computer system also sends the validated edit information to the generic viewer for presentation. The generic viewer has no special knowledge of how to handle the selected entities and corresponding data types.

In another embodiment, a computer system performs a method for navigating between entities of varying data types. For example, a computer system generates a view of entities associated with entities of varying data types for presentation on a generic viewer. The entities and data types have relationships as as defined in a corresponding schema. The schema is stored as data in a repository with the data types. The computer system receives a navigation input indicating selection of a second selected entity associated with a second, different data type. The computer system accesses relationship information for the data types associated with the first and second selected entities. The computer system generating an updated view including the first selected entity and the second selected entity, the updated view being based on the accessed relationship information. The computer system also presents the generated updated view based on the navigation input.

In another embodiment, a computer system performs a method for providing hints in a schema indicating how a entity is to be displayed. For example, a computer system generates a view of entities associated with entities of varying data types for presentation on a generic viewer. The entities and data types have relationships as defined in a corresponding schema. The schema is stored as data in a repository with the data types. The computer system receives a user input indicating an action to be taken on at least one entity. The computer system accesses hints stored in the repository to determine which action to perform on the entity based on the user input. The system uses hints to determine which actions to take when a user provides certain pre-defined inputs. The computer system also performs the determined action according to the hints corresponding to the user input.

In another embodiment, a computer system performs a method for displaying a combination of two or more composed views based on various entities. For example, a computer system generates a first view of various entities associated with entities of various data types for presentation on a generic viewer. The entities and data types have various relationships defined in a corresponding schema. The schema is stored as data in a repository with the data types. The computer system as generates a second view of various entities associated with entities of various data types for presentation on a generic viewer. The computer system receives a user input indicating that the first and the second views are to be integrated. The computer system integrates the first and the second views according to the user input. The computer system also updates the entities associated with the entities of the first view and the second view according to each entity's corresponding schema.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the as appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
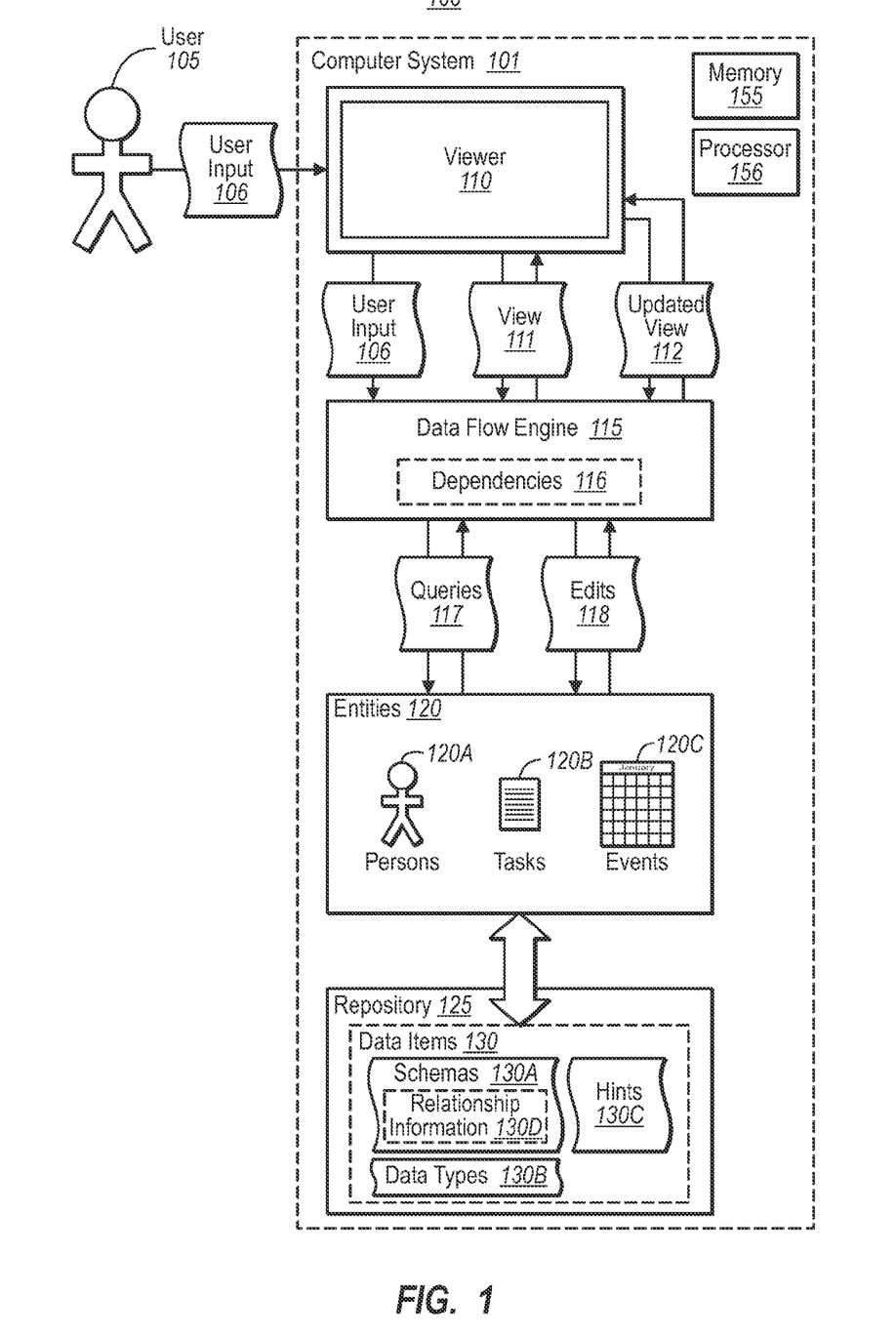
FIG. 1 illustrates a computer architecture in which embodiments of the present invention may operate including editing, navigating and manipulating informational models of varying data types.

FIG. 1 illustrates a computer architecture 100 in which the principles of the present invention may be employed. Computer architecture 100 includes computer system 101. In some embodiments, computer system 101 may include system memory 155 and a processor 156. As explained above, memory 155 may be any type of computer memory including RAM, ROM, solid state, magnetic or other memory. Similarly, processor 156 may be any type of processor, microcontroller, state machine or other means of processing information and/or controlling computer system functionality.

Computer system 101 may also include viewer 110. Viewer 110 may be any type of software or hardware device capable of receiving and displaying an electronic signal. For example, viewer 110 may be configured to receive view 111 or as updated view 112 and display the view to a user. Viewer 110 may also be configured to receive inputs from outside computer system 101 such as, for example, user input 106 from user 105. In some embodiments, viewer 110 may be configured to process and display data received in an intermediary canonical form. User 105 may be any type of computer user including a developer, an end user or any other type of user. User input 106 may be any type of input including mouse, keyboard or other peripheral inputs, gestures as recorded by a touch-screen, camera, or other device, motions, keystroke combinations or other inputs. Viewer 110 may receive user input 106 from user 105 and send user input 106 to data flow engine 115.

In some embodiments, data flow engine manages dependencies between entities and data. For example, data flow engine 115 may manage dependencies 116 between entities 120 and data items 130 in repository 125. Dependencies may be any kind of relationships that may exist between entities, schemas, data types or other data items. Dependencies may track which query results are dependent on certain data items, such that when a data item changes, the queries can be re-evaluated. Data flow engine 115 may also be configured to convert information from an intermediary canonical form into a form that is displayable by viewer 110. Data flow engine 115 may receive the canonical information from entities 120 in the form of queries 117 and/or edits 118, as will be explained below.

Repository 125 may be any means of storing information such as a file, a database, a universal description, discovery and integration (UDDI) registry, a lightweight directory access protocol (LDAP) directory or other form of database or set of databases and may be stored in any type of data store including a hard drive, network drive, flash drive, optical or other type of storage. In some embodiments, any of viewer 110, data flow engine 115 or entities 120 may be configured to read and/or as write information to/from repository 125. Such reading and/or writing may occur directly (without going through any other modules) or indirectly through various modules shown (or not shown) in FIG. 1. Entities 120 may include any type of entity. For simplicity, only persons 120A, tasks 120B and events 120C are shown in entities 120. However, it will be appreciated that any item that can be associated with data can be an entity as the term is used herein. In some cases, entities 120 are canonical representations of data items 130 stored in repository 125.

Data flow engine may communicate with entities 120 and/or repository 125 using queries 117 and/or edits 118. For example, data flow engine 115 may send a query to entities 120 to determine an entity to select. Query 117 may additionally indicate that information is to be read or written to or from repository 125. Similarly, repository 125 may send a query (e.g. query 117) to data flow engine 116 to retrieve dependency or other information. Data flow engine 115 may send proposed edits 118 to entities 120 and/or repository 125. In some cases, entities 120 and data items 130 are each editable, either separately or as a whole. Furthermore, repository 125 may send a proposed edit 118 to data flow engine 115 for validation. Edit validation will be explained in greater detail below, in connection with FIG. 2.

View 111 and updated view 112 may include any type of data presentation. For example, view 111 may include lists, charts, graphs, spreadsheets, web pages, word processing documents, slides, pictures, application windows or any other method of formatting and/or presenting information. Updated view 112 may include any of the above including changes, additions, deletions, substitutions or other alterations made to the view. In some cases, where view 111 has not been changed, or has received information that caused a change in a part of the view that is not currently being viewed, view 111 and updated view 112 may be the same. In cases as where information has been received that would cause a change in a part of the view that is not currently being viewed, and that part of the view is subsequently moved into view, updated view 112 may be updated on the fly, thus potentially saving any unnecessary processing.

Figure 2:
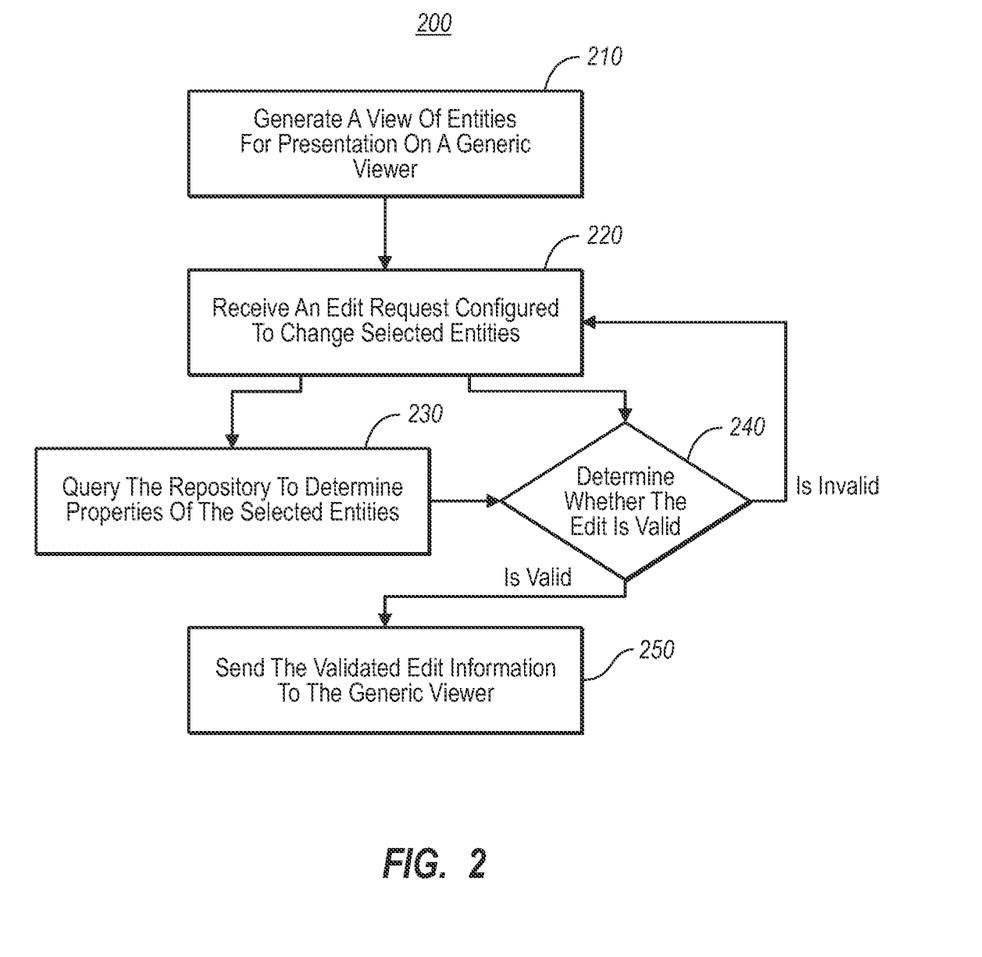
FIG. 2 illustrates a flowchart of an example method for editing one or more entities, the types of which are unknown prior to performing the edit.

FIG. 2 illustrates a flowchart of a method 200 for editing one or more entities, the types of which are unknown prior to performing the edit. The method 200 will now be described with frequent reference to the components and data of environment 100.

Method 200 includes an act of generating a view of one or more entities associated with one or more data types for presentation on a generic viewer, the entities and data types having relationships as defined in a corresponding schema, the schema being stored as data in a repository with the data types (act 210). For example, viewer 110 may generate view 111 of entities 120 (e.g. entities 120A-120C) associated with one or more data types 130B for presentation on viewer 110, where entities 120 and data types 130B have relationships 130D as defined in a corresponding schema 130A, where schema 130A is stored as data in repository 125 with data types 130B. In alternative embodiments, other modules such as data flow engine 115 may generate view 111.

In some cases, view 111 may be based on a portion of a data type. For example, view 111 may be based on the first name of a full name data type (e.g. "John" of "John Doe"). Data types 130B may include any type of data classifier including data formats, layouts, file extensions, file types, naming classifications, organizational classifications and others. In some cases, data types 130B may be definable and/or selectable by a computer user. For example, a user may define a data as type "Business Address" that allows certain data to be entered and may include additional data types such as "Street Name," "Zip Code," "City," and "State." As mentioned above, data types may indicate a file type such as "Picture," "Movie," or "Spreadsheet." Other data types may specify file extensions such as ".jpg," ".mpeg," or ".xls." In some embodiments, a view may be based on combination of different data types. Moreover, the schema may be automatically updated upon detection of a new user-defined data type.

Schema 130A may indicate certain rules and/or relationships between entities 120 and data types 130B. For example, schema 130 may indicate that certain entities such as "Persons" 120A have a data type "Full Name." Schema 130A may also indicate that each "Persons" entity has a "Tasks" entity linked to it. Thus, in some embodiments, when user 105 is editing data in the "Persons" entity 120A, data from "Tasks" 120B may also be available for editing. Furthermore, if any data types overlap or appear in both entities 120A and 120B, updating such data in one entity may automatically update the corresponding data in the other entity. As will be readily appreciated, many combinations of entity and relationships are possible and the above example should not be used to limit the use of schemas, data types, entities, relationships, or any other concept used in the example.

As indicated above, schema 130 may be stored as data in repository 125, similar to the storage of other types of data. In some cases, schema 130 may be editable by user 105. For example, user 105 may input user input 106 which may be used by data flow engine 115 to query and/or edit data items in repository 125. Any information within schema 130A or the entire schema or a group of schemas may be edited by user 105. The user may add hints that describe how entities based on the schema are to be presented. For example, user 106 may add a hint to schema 130A as that indicates how the "Events" entity 120C is to be presented if certain other entities are already being displayed or if entity 120C is being displayed by itself Many other properties or rules may be altered by changing the schema data. In some cases, entities may be localizable in one or more languages.

Method 200 includes an act of receiving an edit request configured to change one or more selected entities, each entity having an associated data type (act 220). For example, viewer 110 may receive user input 106 that includes an edit request configured to change entities 120, where each entity has an associated data type (e.g. data types 130B). Data flow engine 115 may process user input 106 before passing input 106 on to entities 120 and repository 125 in the form of a query 117 or an edit 118. Additionally or alternatively, data flow engine 115 may simply pass user input 106 on to entities 120 and/or repository 125 without processing it. Query 117 may, in some embodiments, include a query for those entities selected by user 105 in user input 106. Edit 118 may, in some embodiments, include a processed query that includes the intended edits and/or an indication that the edit is valid, based on dependencies 116.

Method 200 includes an act of querying the repository to determine one or more properties of the selected entities corresponding to the received edit request including the data type (act 230). For example, query 117 may be used to query repository 125 to determine properties of the user-selected entities corresponding to the received edit request in user input 106 including the data type 130B.

Method 200 also includes an act of determining, based on the schema, that the edit is valid based on relationship information stored in the schema (act 240). For example, computer system 101 may determine, based on schema 130 and relationship as information 130D, that edit 118 is valid. User 105 may indicate in user input 106 that the "Tasks" entity is to be edited. More specifically, input 106 may indicate that "Date" data types be changed from a "year/month/day" format to a "day/month/year" format. If schema indicates that either format is allowable for that data type, the edit may be declared valid. If, however, user input 106 indicated that the "Date" data types be changed from "year/month/day" to "full name," the indicated edit may be declared invalid because the schema would not allow a "full name" data type. Schemas 130A and relationship information 130D may specify any type of information that is or is not to be present in a certain entity and may further specify data types or any other information that is or is not to be present in an entity based on schema 130A. In some cases, the edit may be validated prior to receiving the edit request. Such a configuration may allow a user to enable/disable certain commands, build menus of validation commands or select other system features.

Method 200 also includes an act of sending the validated edit information to the generic viewer for presentation, the generic viewer having no prior knowledge of how to handle the selected entities and corresponding data types (act 250). For example, either repository 125 or entities 120 may send validated edit information in edits 118 to viewer 110 for presentation. Generic viewer 110 may have no prior knowledge of how to handle selected entities 120 and corresponding data types 130B.

Viewer 10 may thus, without any prior indication of how to present a certain entity or a certain data type, may refer to the schema corresponding to the entity and determine how to present the entity. For example, if viewer 110 has never presented an "Events" entity with a user-defined data type "Conferences," viewer 110 can look to schema 130A to determine how to present the information. Such a t reference to the schema is dynamic and can be performed each time an entity is to be as presented. In some cases, a user may view the selected entities either individually or as part of a generated view based on the valid edit information. For example, a user may opt to view the selected entities before they are edited. In other cases, a user may desire to view the entities after the edits have been performed. In still other cases, the user may view the edits as they are being performed.

In some embodiments, computer system 101 may perform an optional act of sending a list of each data type available in the repository. This may be useful in cases where user 105 desires to know of all the data types 130B that are available in repository 125.

Figure 3:
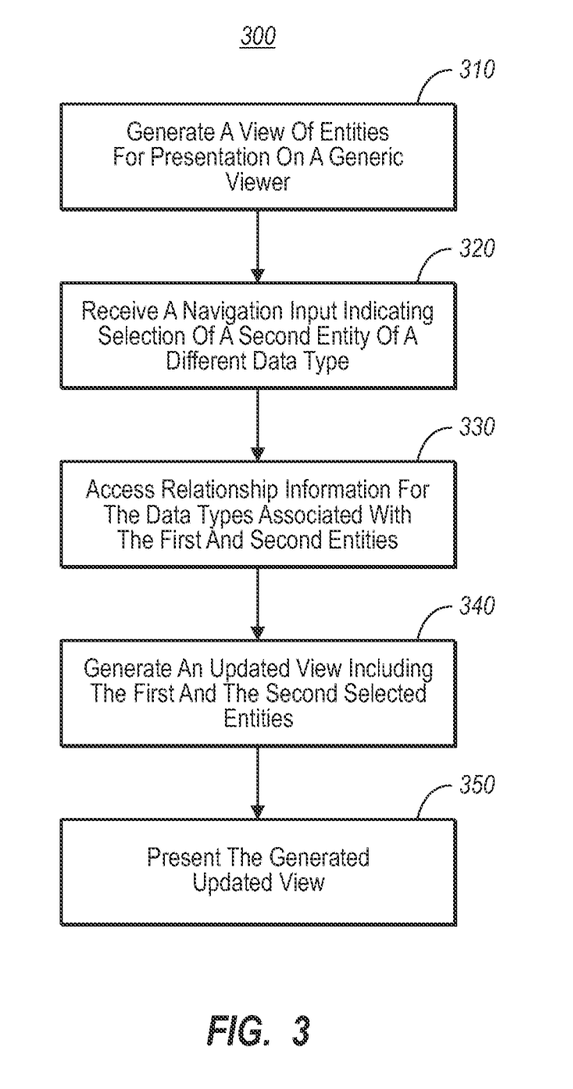
FIG. 3 illustrates a flowchart of an example method for navigating between entities of varying data types.
Figure 6A:
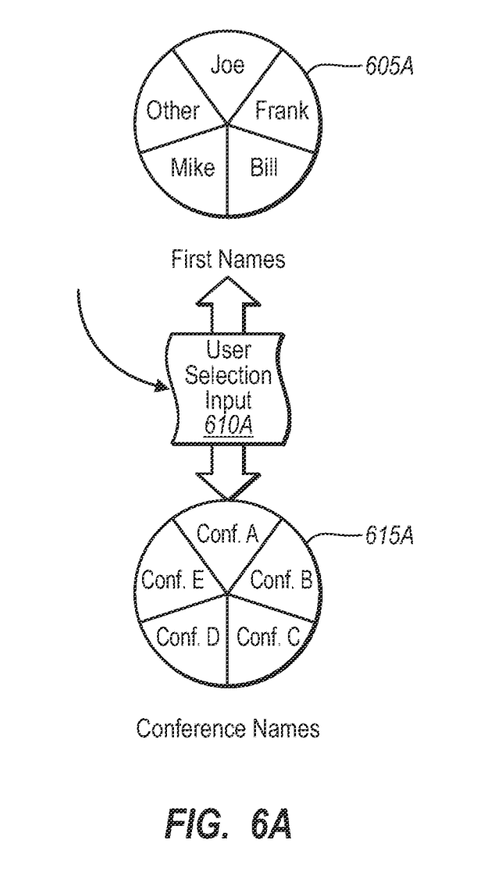
FIG. 6 illustrates an embodiment of the present invention in which information is displayed and navigated.
Figure 6B:
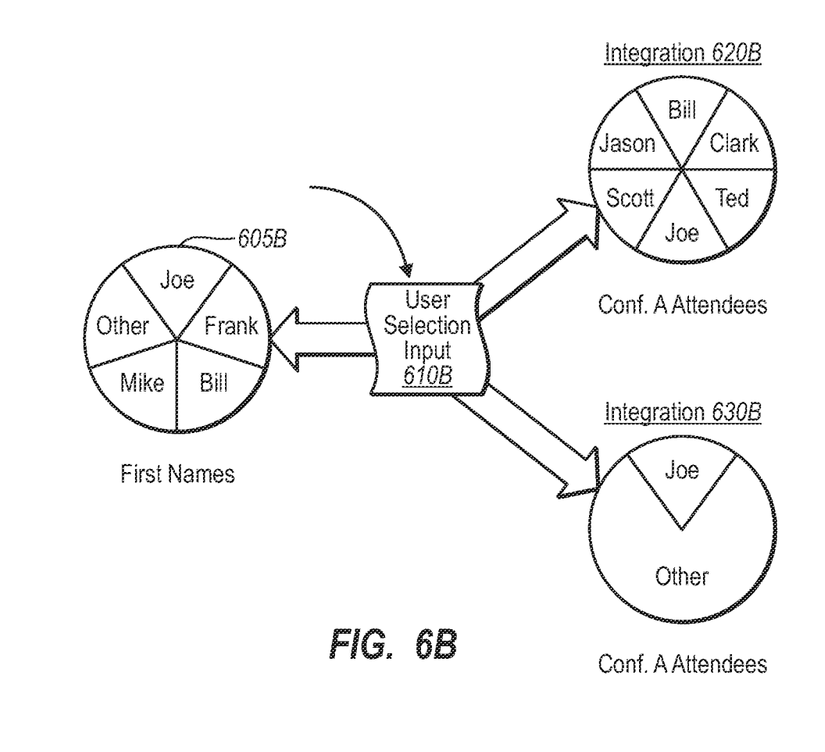

FIG. 3 illustrates a flowchart of a method 300 for navigating between entities of varying data types. The method 300 will now be described with frequent reference to the components and data of the environments depicted in FIGS. 1, 6A and 6B.

Method 300 includes an act of generating a view of a first selected entity associated with a first data type for presentation on a generic viewer, the entities and data types having relationships as defined in a corresponding schema, the schema being stored as data in a repository with the data types (act 310). For example, viewer 110 may generate pie chart view 605A associated with a data type of "First Name." Entities of the first names Joe, Frank, Bill, Mike and other are depicted in 605A. These entities may have relationships as defined in schema 130A, where the schema is stored as data in repository 125 with data types 130B (e.g. "First Name"). View 605A may represent all or a subset of the first names in a repository. For example, view 605A may represent the first names of those that are attendees at a conference.

Method 300 includes an act of receiving a navigation input indicating selection of a second selected entity associated with a second, different data type (act 320). For example, computer system 101 may receive user selection input 610A (which may be the same as or different than user input 106) from user 105. User selection input 610A may indicate a selection of a different data type or an entity with a different data type. For example, a user may select to view a pie chart of all or a subset of the conferences stored in repository 125. As a result, view 615A may be displayed to show those entities of the "Conference" data type (in this example, Conf A, Conf. B, Conf C, Conf D, and Conf E). Thus, the user navigates from one view to another. In some cases, entities with different data types are found through a relationship with a first selected entity. For instance, in the above example, view 605A may display the first names of those that attended any of conferences A-E. Thus, when a user selects a first name, data associated with the conference may additionally linked to each user's name.

In some cases, computer system 101 may be configured to receive a plurality of navigation inputs indicating selection of a plurality of selected entities associated with a plurality of data types. For example, multiple user selection inputs 610A may indicate a selection of entities with data types "First Name," "Age," "Company," and "Email Address." In this example, viewer 110 may be configured to display each entity, one at a time, groups of entities, or all of the entities at the same time, regardless of the data type. Each entity may be displayed based on its relationship with other entities.

Method 300 includes an act of accessing relationship information for the data types associated with the first and second selected entities (act 330). For example, computer system 101 may access relationship information 130D for data types 130B associated with first and second selected entities "Joe" and "Conf. A." As explained above, entities such as "Joe" and "Conf A" may share some type of as relationship in that Joe may be a Conf. A attendee.

Method 300 includes an act of generating an updated view including the first selected entity and the second selected entity, the updated view being based on the accessed relationship information (act 340). For example, computer system 101 may generate updated view 112 (which may or may not be the same as view 615A) including the first selected entity (e.g. "Joe") and the second selected entity (e.g. "Conf A"), where updated view 112 is based on relationship information 130D. Relationship information 130D may be any type of information, part of schema 130A or otherwise, that may be used to link or connect entities of varying data types.

Method 300 also includes an act of presenting the generated updated view based on the navigation input (act 350). For example, generated updated view 112 may be presented on viewer 110, where the view was generated as a result of receiving the user selection input. A user may view the selected entities either individually or as part of the generated updated view. For example, a user may opt to view the selected entities before they are edited. In other cases, a user may desire to view the entities after the edits have been performed. In still other cases, the user may view the edits as they are being performed. In alternative embodiments, a link to the generated updated view 112 may be presented such that the generated updated view can be presented in another application window. The link may be a hyperlink or other type of link that allows all or a portion of the view to be opened in another application window.

Figure 4:
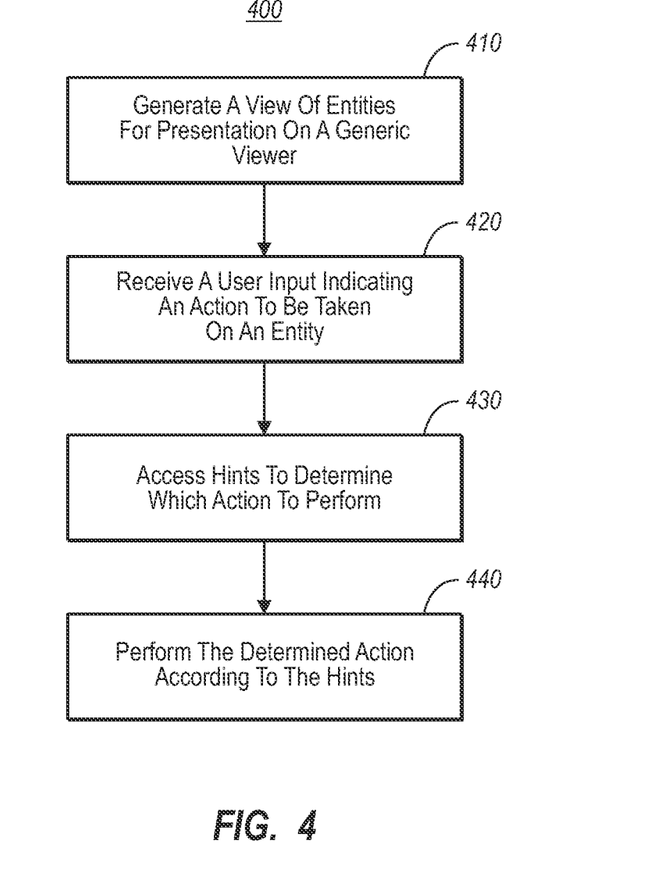
FIG. 4 illustrates a flowchart of an example method for providing hints in a schema indicating how an entity is to be displayed.

FIG. 4 illustrates a flowchart of a method 400 for providing hints in a schema indicating how an entity is to be displayed. The method 400 will now be described with frequent reference to the components and data of environment 100.

Method 400 includes an act of generating a view of one or more entities as associated with one or more data types for presentation on a generic viewer, the entities and data types having various relationships defined in a corresponding schema, the schema being stored as data in a repository with the data types (act 410). For example, viewer 110 may generate view 111 of entities 120 (e.g. entities 120A-120C) associated with one or more data types 130B for presentation on viewer 110, where entities 120 and data types 130B have relationships 130D as defined in a corresponding schema 130A, where schema 130A is stored as data in repository 125 with data types 130B. In alternative embodiments, other modules such as data flow engine 115 may generate view 111.

Method 400 includes an act of receiving a user input indicating an action to be taken on at least one entity (act 420). For example, viewer 110 may receive user input 106 indicating an action to be taken on "Persons" entity 120A. It should be noted that any reasonable action may be specified by user input 106. For example, the action to be taken may include creating, reading, updating, deleting, editing, moving, duplicating, or any other action. User input 106 may include mouse gestures, keyboard gestures, or a combination of mouse and keyboard gestures. For example, certain keystrokes or certain mouse clicks may be interpreted as deleting, updating or other gestures. Mouse gestures may include double clicking, clicking and dragging, mouseovers and all other forms of mouse communication. Other devices such as cameras and touchscreens may also be used to input gestures. Interpretation of gestures and/or mapping gestures to commands may be done manually by a user or automatically by a software program. Gesture to command maps may be customized by user 105.

Method 400 includes an act of accessing one or more hints stored in the repository to determine which action to perform on the entity based on the user input, as the hints describing which actions to take when a user provides certain pre-defined inputs (act 430). For example, data flow engine 115 may access hints 130C stored in repository 125 to determine which action to perform on the entity (e.g. "Persons") based on user input 106. Hints 130C may describe which actions to take when a user provides a certain gesture. For example, hits 130C may dictate that when user input 106 includes a double click on the entity, the entity is to be duplicated. Other hints may indicate that when an entity is double clicked, the entity becomes available for editing. Hints 130C may tie any gesture to any piece of functionality that may be used on an entity. Hints may additionally or alternatively be used to allow a user to select properties of an entity. For example, the hints may specify that upon receiving certain gestures, an entity's layout, shape, color or other properties may be selected and/or changed. In some cases, hints may be used to build a view prior to receiving user input 106.

Method 400 includes an act of performing the determined action according to the hints corresponding to the user input (act 440). For example, computer system 101 may perform the determined action according to hints 130C corresponding to user input 106. As explained above, user input 106 may include gestures. The gestures may be mapped to actions to take on a selected entity. Repository 125 may store hints 130C which may be used entirely, or in addition to schema 130A to determine which action to perform based on the received gesture.

Figure 5:
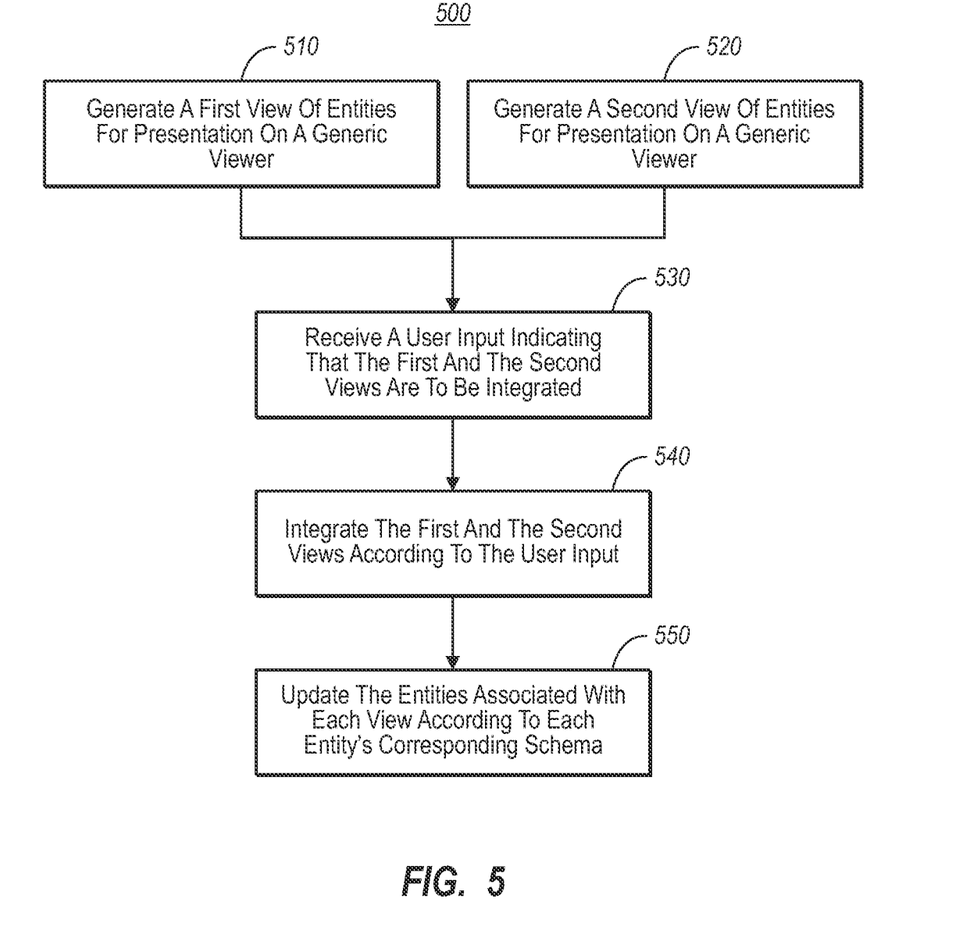
FIG. 5 illustrates a flowchart of an example method for displaying a combination of two or more composed views based on one or more entities.

FIG. 5 illustrates a flowchart of a method 500 for displaying a combination of two or more composed views based on one or more entities. The method 500 will now be described with frequent reference to the components and data of the environments depicted in FIGS. 1, 6A and 6B.

Method 500 includes an act of generating a first view of one or more as entities associated with one or more data types for presentation on a generic viewer, the entities and data types having various relationships defined in a corresponding schema, the schema being stored as data in a repository with the data types (act 510). For example, as explained with regard to method 300, viewer 110 may generate pie chart view 605B associated with a data type of "First Name." Entities of the first names Joe, Frank, Bill, Mike and other are depicted in 605B. These entities may have relationships as defined in schema 130A, where the schema is stored as data in repository 125 with data types 130B (e.g. "First Name"). View 605B may represent all or a subset of the first names in a repository. For example, view 605B may represent the first names of those that are attendees at a conference.

Method 500 includes an optional act of generating a second view of one or more different entities associated with one or more data types for presentation on a generic viewer (act 520). For example, similar to act 510, viewer 110 may generate a chart or other view associated with a selected data type, as indicated in user selection input 610B. The second view may or may not be displayed on viewer 10, or at least certain portions of the second view may or not be displayed. Whether to display the second view may be determined by the user. In some cases, a user may wish to create a "mashup" of two or more views. A mashup is a combination or integration of one or more elements of multiple different views. For example, a user may wish to combine element A from one view, element B from one view and element C from another and combine them into one view. This will be explained in greater detail below.

Method 500 includes an act of receiving a user input indicating that the first and the second views are to be integrated (act 530). For example, computer system 101 may receive user selection input 610B indicating that the first and the second views are to be integrated. In some cases, integration implies that subsequent as user actions (e.g. selection) in one view will cause change in the other view. In one example, a first view may show a chart of first names stored in repository 125. The second view (not shown) may include a chart of available conferences (e.g. Conferences A-E). User 105 may select conference A, and by combining the two views, may result in integration 620B. Integration 620B depicts a pie chart view of the first names of those that attended conference A. Such an integration could be termed a mashup of a view of first names in repository 125 and available conferences stored in repository 125. Many other examples are possible. As can be seen in Integration 630B, if a user were to select an attendee's first name (e.g. "Joe") and the conference name ("Conf A"), the chart may show a graph of those users that attended Conf. A named Joe. Other name/conference relationships and charts are possible. Furthermore, it should be noted that any type of model or chart may be used as well as any data type. The above examples are intended for illustration purposes only and represent a very small number of the many possible embodiments.

Method 500 includes an act of integrating the first and the second views according to the user input (act 540). For example, computer system 101 may integrate the first and second views according to user input 610B. The integration of two or more views may be based on how the user wants the data presented and which parts of each view to use in the overall integration. In some embodiments, the method integrating the two views may be determined by which gestures the user used in input 610B. For example, if a user clicked and dragged a first view onto a second view, the integration may include overwriting any overlapping elements of the first view with those elements from the second, but keeping any unique elements of the first view. Similar to the examples above, these should not be used to limit the types of integration that are possible.

Method 500 also includes an act of updating the entities of the first view and the second view according to each entity's corresponding schema (act 550). For example, entities such as "Joe" and "Conf. A," as used in the above examples, may be updated according to each entity's corresponding schema. The schema may dictate relationships with other entities that are to be kept while updating the entities. In some embodiments, the schema may be accessed to obtain relationship information corresponding to the entities that may dictate how to perform the updates. In some cases, updating the view may occur automatically upon selection of a second view.

Thus, embodiments for editing, navigating and manipulating informational models of varying data types have been presented. Entities of varying data types may be edited without knowing the data type beforehand. Entities of varying data types may be navigated based on relationships between the entities. Hints may be provided in a schema to indicate how an entity is to be displayed. Also, combinations of tow or more composed views may be displayed based on a user selection input.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system comprising at least one processor, a method for displaying and editing one or more types of entities, the types of which are unknown prior to displaying and performing the edit, the method comprising:

the processor generating a view of a plurality of entities associated with a plurality of different data types for presentation on a generic viewer, the entities and data types having relationships as defined in a corresponding schema, the schema and data types being stored as data in a repository, wherein generating a view comprises accessing the schema and relationships in the repository in order to determine the format in which the view is generated wherein the view is based on a portion of the data type;

receiving an edit request configured to change one or more selected entities, each entity having an associated data type;

querying the repository to determine one or more properties of the selected entities corresponding to the received edit request including the data type of each of the selected entities;

determining, based on the schema, that the edit is valid for that entity and data type based on relationship information stored in the schema; and sending the validated edit information to the generic viewer for presentation, the generic viewer dynamically determining how to present the selected entities and data types according to the presentation format intended for that entity and data type as specified by the schema, having no prior knowledge of how to handle the selected entities and corresponding data types.

2. The method of claim 1, further comprising sending a list of each data type available in the repository.

3. The method of claim 1, further comprising viewing the selected entities.

4. The method of claim 1, wherein the schema includes hints that describe how entities are to be presented based on the schema.

5. The method of claim 1, wherein the entities are localizable in one or more languages.

6. The method of claim 1, wherein at least one of the plurality of different data types is a user-defined data type.

7. The method of claim 1, further comprising automatically updating the schema upon detection of a new user-defined data type.

8. The method of claim 1, further comprising accessing the schema to obtain relationship information corresponding to the entities of one or more data types.

9. The method of claim 1, wherein the entities include two or more of the following: text files, presentation files, spreadsheet files, graphic files, audio files, movie files, web page files, word processing files, pictures files, contact lists, charts, tasks and events.

10. At a computer system including a processor, a method for providing hints in a schema indicating how an entity is to be displayed without prior knowledge of how to handle the entity, the method performed by the processor executing computer-executable instructions which enable the method, the method comprising:

generating a view of a plurality of entities associated with a plurality of different data types for presentation on a generic viewer, the entities and data types having relationships as defined in a corresponding schema, the schema and data types being stored as data in a repository, wherein generating a view comprises accessing the schema and relationships in the repository in order to determine the format in which the view is generated wherein the view is based on a portion of the data type; wherein at least one of the data types is a user-defined, custom data type;

receiving a user input indicating an action to be taken on at least one selected entity of a certain data type;

accessing one or more hints stored in the repository to determine which action to perform on the entity based on the user input, the hints describing which actions to take when a user provides certain pre-defined inputs for certain types of entities;

performing the determined action according to the hints corresponding to the user input; and presenting the results of the performed action on the generic viewer, wherein the generic viewer dynamically determines how to present the selected entities and data types according to the presentation format intended for that entity and data type as specified by the schema, having no prior knowledge of how to handle the selected entities and corresponding data types.

11. The method of claim 10, wherein the user input comprises mouse gestures, keyboard gestures, or a combination of mouse and keyboard gestures.

12. The method of claim 10, wherein hints are used to select display properties.

* * * * *